Nov. 4, 1947.   R. P. GARRISON ET AL   2,430,009

RANGE FINDER

Filed Jan. 28, 1942

Patented Nov. 4, 1947

2,430,009

UNITED STATES PATENT OFFICE 2,430,009

RANGE FINDER

Ralph P. Garrison and John R. Garrison, Dayton, Ohio, assignors to Garrison Machine Works, Inc., Dayton, Ohio, a corporation of Ohio Application January 28, 1942, Serial No. 428,596

3 Claims. (Cl. 33—46)

This invention pertains to precision measuring instruments, and more particularly to a thermal conditioning system therefor, whereby the calibration of such instruments may be maintained constant under dissimilar atmospheric and body temperature influence and varying working conditions.

Measuring instruments, such as transits, range finders and the like, are quite susceptible to change of size alignment and variation of indicated values under influence of temperature change of the surrounding atmosphere, and even as a result of handling or radiated heat from the operator's body.

Under manufacturing conditions and tolerances which prevailed until comparatively recent times, minute variations of size due to temperature change incident to fluctuations of room temperature or handling were negligible and deemed unimportant.

However, under modern high precision engineering practice, wherein permitted maximum tolerances of one-ten thousandth of an inch are common, and tolerances of one hundred thousandth of an inch or less not unusual, there is presented a highly important problem of minimizing distortion and warping of measuring instruments incident to thermal change.

In the present instance there is contemplated means for thermal conditioning such measuring instruments and maintenance of a constant temperature condition by subjecting the instrument to fluctuating thermal influence proportioned inversely to the degree of external heat absorbed by the instrument or dissipation of heat therefrom incident to surrounding atmospheric conditions.

While for certain conditions of use and instruments of peculiar adaptation it may be desirable to subject the instrument to cooling influence by which heat absorbed or generated during use is offset or compensated, it has been found more desirable and practicable to maintain a temperature level equal to or somewhat above the maximum temperature influence to which the instrument is likely to be subjected by automatically adding to the absorbed or generated heat an additional degree of heat proportioned inversely thereto, as may be necessary to maintain the established thermal level.

The object of the invention is to provide a calibration maintenance system for precision measuring instruments which will not materially increase the cost of manufacture or operation thereof, and which not only will be simple and economical in construction and application, but will be efficient in use, automatic in operation, uniform in action, having minimum parts, and be unlikely to get out of repair.

A further object of the invention is to materially increase the accuracy of precision measuring instruments under different operating conditions.

A further object of the invention is to enable automatic maintenance of calibration of measuring instruments under varying external conditions.

A further object of the invention is to maintain measuring instruments in constant operating condition and eliminate the necessity for a preliminary warming up or stabilizing period.

A further object of the invention is to incorporate in measuring instruments an automatic constant thermal control system having the advantageous structural features and inherent meritorious characteristics and mode of operation herein mentioned.

With the above primary and other incidental objects in view as will more fully appear in the specification, the invention intended to be protected by Letters Patent consists of the features of construction, the parts and combinations thereof, and the mode of operation, or their equivalents, as hereinafter described or illustrated in the accompanying drawings.

While the present thermal control system is applicable to a wide variety of measuring instruments and analogous devices, both portable and stationary, for illustrative purpose, but with no intent to unduly limit the scope or application of the invention, a range finder has been shown as a typical example. In the accompanying drawings, Fig. 1 is a side elevation of a typical range finder, wherein the present invention has been embodied.

Like parts are indicated by similar characters of reference throughout the several views.

The present thermal control system eliminates the necessity of making more or less frequent adjustments of instruments to compensate for fluctuation of room temperature or outside weather conditions, and maintains the calibration constant regardless of the fact that the instrument may be idle a part of the twenty-four hour period, and the temperature of the instrument and room temperature be materially changed. It is frequently found that without such control measuring instruments may operate better and more accurately during certain periods of the day than they do at other times, and that as a result there may be variations in the result, which according to present day precision standards, may be deemed serious. The present system of thermal regulation is applicable to a wide range of purposes, as, for example, its illustrated application to a range finder, wherein a slight deviation of a ten thousandth of an inch in the instrument may cause a great error in the indicated location of a target at a distance of several miles.

Figure 1:
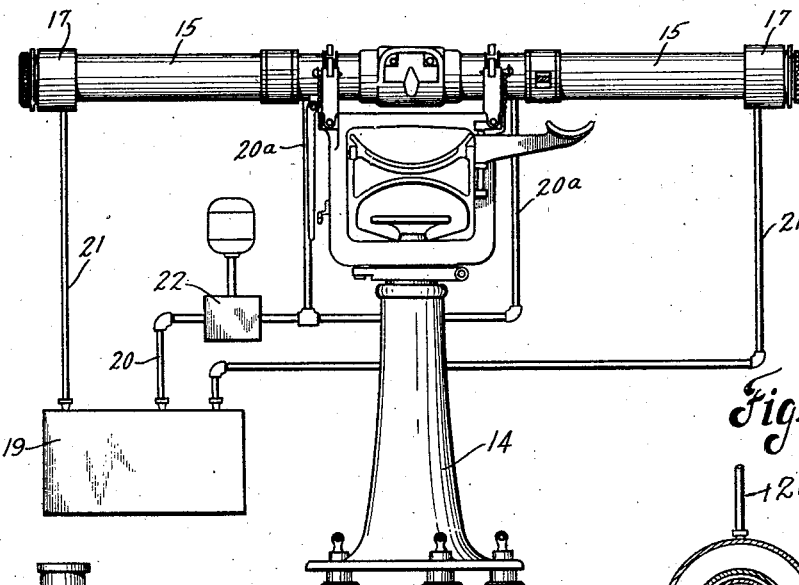
Figure 3:
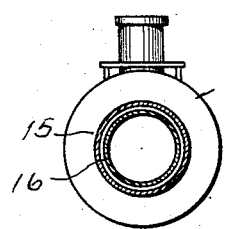
Fig. 3 is a transverse sectional view thereof on line 11—11 of Fig. 2.
Figure 4:
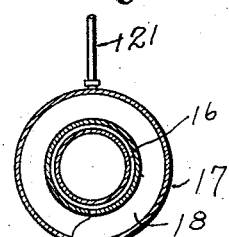
Fig. 4 is a transverse sectional view on line 12—12 of Fig. 2.
Figure 2:
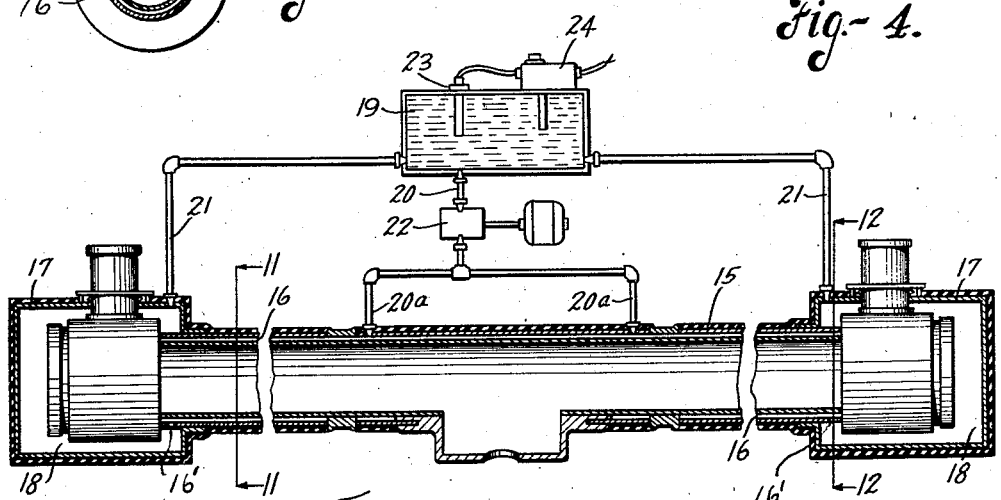
Fig. 2 is a longitudinal sectional view of the range finder barrel illustrating somewhat diagrammatically application of the present thermal conditioning features.

As illustrating the universal capabilities of the present thermal conditioning disclosure, there is shown in Figs. 1 and 2 a typical stereoscopic or incidence type of range finder to which the present system is applicable. In the drawings 14 is the pedestal of the range finder upon which is adjustably supported a transverse barrel 15, in which is contained an optical system including objective lenses positioned adjacent to opposite ends of the tube 15 and a series of prisms or reflecting surfaces by which images are projected from the objective lenses onto a common field or eye piece prism at mid-length of the tube, where by manipulation of the device the images from the respective objectives are brought into registry of coincidence, enabling the distance of the object or target to be mathematically computed in accordance with the relative adjustment of parts necessary to such result. In effect the axis of the barrel becomes the base of an equilateral triangle with the target at the apex thereof, the altitude of which is to be ascertained as the range or distance of such target. The particular construction of the range finder is immaterial here, other than to say that the slightest warping or distortion of the barrel 15 or the mountings of the objective lenses or reflecting prisms will seriously affect the accuracy of the "known" base angles of such triangle, with consequent error in the calculation of its estimated altitude.

Such range finders are used under all weather and temperature conditions, and hence are subject to much wider range of expansive and contractive influence than are the measuring instruments heretofore mentioned. The slightest deviation of the barrel 15 as a result of expansion or contraction due to temperature change will be greatly amplified and may cause great error in the estimated location of the target. However, such error may be minimized or substantially eliminated by applying to the range finder the thermal control system herein described.

The barrel 15 is ordinarily of double wall construction, having an intermediate space 16 between the inner and outer tubular walls. The objectives at the opposite ends of the barrel 15 are enclosed in housings 17 defining spaces 18 which communicate with the interwall space 16 of the barrel. The walls of the barrel and of the terminal housings 17 are preferably thermally insulated.

Associated with the range finder is a tank or reservoir 19 for heat exchange medium, which is connected through a conduit 20 and branch conduits 20a with the interwall space 16 of the range finder barrel. The terminal housings 17 of the barrel are interconnected by return conduits 21 with the supply reservoir 19. An impeller or pump 22 interposed in the system, in this instance the conduit 20, induces a circuitous flow of the heat exchange medium from the reservoir 19 through the spaces 16 and 18 of the barrel 15 and return to the reservoir. If desired, the direction of circulation may be reversed. At some convenient point in the system, in the present instance in the tank 19, there is interposed a heater unit 23 at a level above the maximum temperature to which the barrel is likely to be subjected. Also interposed in the system and subject to the temperature of the heat exchange medium is a thermal control unit 24 subject to the temperature of the heat exchange medium, by which the heating unit 23 is regulated.

The construction and arrangement is such that the temperature of the heat exchange medium is caused to fluctuate inversely as the external temperature influence to which the range finder is subjected, and thereby maintain the temperature of the instrument substantially constant, and automatically compensate for changing weather and atmospheric conditions and body heat influence of the operator.

The herein described mode of operation, including the steps of maintaining an operating temperature equal to or above the maximum temperature influence to which the instrument is likely to be subjected by supplying heat thereto proportioned inversely to the degree of heat acquired from external source, is equally applicable to other types of measuring instruments, and hence is not limited to the specific type mentioned.

For example, clocks and chronometers, although designed for accurate time measurements, are susceptible to temperature influence under which the tension of springs, leverage and spacing of operating parts may vary minutely incident to expansion or contraction, and thereby effect acceleration or deceleration. Likewise, bearings may contract or expand, thereby affording slightly varying degrees of resistance, which may, however, be sufficient to effect the operation. Likewise, expansion and contraction of frame parts may microscopically change the distance between centers and so vary the leverage or ratio of movement of driving gears or operating levers. However, by supplying heat to the instrument in varying degree inversely proportionate to the fluctuations of external temperature influence, atmospheric or room temperature in the manner heretofore described, varying temperature influences may be compensated and the clock may be maintained at a substantially uniform operating condition, with increased accuracy of result. The present method may be applied by providing the clock mechanism with a reservoir and circulation passages for heat exchange medium which is subject to influence of external thermal conditions plus the influence of a heater unit controlled by a thermostatic device subject to the influence of the heat exchange medium.

Much the same condition prevails as to weighing scales, both of the spring and the lever types. The fluctuation of external temperature influence may minutely change the tension of the spring, or due to expansion and contraction the scale beam or amplifying levers may be lengthened or shortened, or distances between centers may be varied sufficiently to produce error in the indicated weight of material being measured. By subjecting the scale mechanism to equalized temperature in the manner and according to the method heretofore described, the disturbing effect of external temperature influence can be overcome. For example, the scale frame and operating parts may include a reservoir and circulation passages for heat exchange medium which is subject to both external influence and a supplemental regulated heating influence inversely proportionate to the external influence, whereby a stabilized temperature balance will be maintained.

While an altimeter functions because of variations of atmospheric pressure with changes in altitude, yet the reading of an altimeter is so affected by temperature influence and expansion and contraction as to necessitate frequent compensation. A most important consideration of an air pilot for safe clearance of high mountains is the effect of temperature variations in the air column upon the altimeter reading. At lower altitudes control of expansion is a relatively simple matter. However, as the troposphere and stratosphere are reached, each one thousand feet of climb increases rapidly the problem of precise barometric measurement and temperature compensation. The variation between true and indicated altitude is caused by the tendency of the air column to expand and contract with fluctuations of temperature. This expansion and contraction causes variations in the barometric pressure with resulting variations in altimeter reading. Altimeters are ordinarily calibrated for assumed standard condition of 59 degrees F. at sea level and for a decrease of 3.6 degrees F. for each one thousand feet of altitude attained. Variation of actual temperatures below such "standard" cause the altimeter readings to be high, and vice versa.

The present system of automatic temperature compensation enables maintenance of such "standard" conditions under all operating conditions and obviates necessity for computation and compensating adjustment. The instrument may be provided with a reservoir and circulation passages for the thermally regulated heat exchange medium, as illustrated in the drawing.

The application of the invention to measuring instruments for time, space, weight and pressure is deemed to be within the scope of the hereinafter stated claims. The present invention is a further development and amplification of that disclosed in Letters Patent No. 2,271,637, issued February 3, 1942, upon a copending application therefor.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described our invention, we claim:

1. A range finder, wherein a tubular barrel having double spaced walls, is provided with an optical system enclosed therein, characterized by thermal conditioning means for preventing distortion and disturbance of the optical system by expansion and contraction of said barrel, including a reservoir for heat exchange medium interconnected with the barrel for circulation of heat exchange medium intermediate the double walls of the barrel, a heater for the heat exchange medium and a temperature regulator operative to inversely proportion the temperature of the heat exchange medium derived from the heater to external thermal influence upon the barrel.

2. A range finder, wherein an extended support for an optical system, is subject to deflection by expansion and contraction of the support incident to fluctuation of temperature influence thereon by which the accuracy of calibration of indicated results thereof is destroyed, characterized by thermal conditioning means for preventing derangement of the support by external thermal conditions, including a circulatory system for a body of heat exchange medium in intimate relation with the optical system support, means for inducing circulation of heat exchange medium relative thereto, a heater to which the circulating heat exchange medium is subjected, and a temperature regulator subject to the influence of the circulating heat exchange medium and operative to inversely proportion the heat transmitted to the heat exchange medium by the heater to the thermal influence upon the support from external source.

3. A range finder wherein the optical elements of the range finder are subject to deflection by expansion and contraction of the instrument incident to fluctuation of temperature influence thereon, with resultant inaccuracy of range indications, including a passage therein for circulation of heat exchange medium, a source of supply of heat exchange medium connected with the circulatory passage, a thermal conditioner therefor, and a regulator for automatically inversely proportioning the temperature of the circulating heat exchange medium to the influence of atmospheric temperature upon the range finder, whereby the temperature thereof will be maintained substantially constant.

RALPH P. GARRISON.
JOHN R. GARRISON.

REFERENCES CITED

The following references are of record in the file of this patent:

UNITED STATES PATENTS

| Number | Name | Date |
|---|---|---|
| 2,104,563 | Kurlbaum | Jan. 4, 1938 |
| 1,898,531 | Gebhard et al. | Feb. 21, 1933 |
| 2,177,009 | Terry | Oct. 24, 1939 |
| 1,715,750 | Gano | June 4, 1929 |
| 2,232,537 | Kollsman | Feb. 18, 1941 |
| 2,289,095 | Bletz | July 7, 1942 |
| 2,171,273 | Cunningham | Aug. 29, 1939 |
| 2,273,375 | Ray | Feb. 17, 1942 |
| 1,843,566 | Lake | Feb. 2, 1932 |